United States Patent
Meng et al.

(10) Patent No.: US 12,165,060 B2
(45) Date of Patent: Dec. 10, 2024

(54) METHOD AND APPARATUS FOR IMAGE PROCESSING, TERMINAL

(71) Applicant: GUANGDONG OPPO MOBILE TELECOMMUNICATIONS CORP., LTD., Guangdong (CN)

(72) Inventors: Zibo Meng, Palo Alto, CA (US); Runsheng Xu, Palo Alto, CA (US); Jin Pi, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 395 days.

(21) Appl. No.: 17/696,787

(22) Filed: Mar. 16, 2022

(65) Prior Publication Data
US 2022/0207870 A1   Jun. 30, 2022

Related U.S. Application Data

(63) Continuation of application No. PCT/CN2020/109581, filed on Aug. 17, 2020.

(51) Int. Cl.
| | |
|---|---|
| *G01S 7/41* | (2006.01) |
| *G06N 3/08* | (2023.01) |
| *G06T 3/4046* | (2024.01) |
| *G06V 10/44* | (2022.01) |

(Continued)

(52) U.S. Cl.
CPC ............. *G06N 3/08* (2013.01); *G06T 3/4046* (2013.01); *G06V 10/454* (2022.01); *G06V 10/82* (2022.01); *G06V 40/16* (2022.01); *G06V 40/172* (2022.01)

(58) Field of Classification Search
CPC ................. G06T 7/50; G06K 9/00288; G06K 9/00228; G06K 9/00281; G06F 21/32; G06N 3/02
See application file for complete search history.

(56) References Cited

U.S. PATENT DOCUMENTS

2018/0293429 A1* 10/2018 Wechsler ............... G06F 21/32

FOREIGN PATENT DOCUMENTS

| | | |
|---|---|---|
| CN | 109190752 A | 1/2019 |
| CN | 109285112 A | 1/2019 |
| CN | 109978936 A | 7/2019 |

(Continued)

OTHER PUBLICATIONS

L. I. Rudin, S. Osher, and E. Fatemi. "Nonlinear total variation based noise removal algorithms", 1992.

(Continued)

*Primary Examiner* — Phuoc H Doan
(74) *Attorney, Agent, or Firm* — Young Basile Hanlon & MacFarlane, P.C.

(57) ABSTRACT

Provided are a method and apparatus for image processing and a terminal. In the method, an input image is received and processed in a neural network to obtain an output image according to global information of the input image. The terminal includes at least one processor; and a memory coupled with the at least one processor and configured to store instructions which, when executed by the at least one processor, are operable with the at least one processor to implement a neural network to receive an input image and process the input image in the neural network to obtain an output image according to global information of the input image.

16 Claims, 7 Drawing Sheets

(51) Int. Cl.
*G06V 10/82* (2022.01)
*G06V 40/16* (2022.01)

(56) References Cited

FOREIGN PATENT DOCUMENTS

| | | |
|---|---|---|
| CN | 110110751 A | 8/2019 |
| WO | 2018170393 A2 | 12/2018 |

OTHER PUBLICATIONS

J. Portilla, V. Strela, M. J. Wainwright, and E. P. Simoncelli. "Image denoising using scale mixtures of Gaussians in the wavelet domain", 2003.

J. Mairal, F. Bach, J. Ponce, G. Sapiro, and A. Zisserman. "Non-local sparse models for image restoration", 2009.

S. Gu, L. Zhang, W. Zuo, and X. Feng. "Weighted nuclear norm minimization with application to image denoising", 2014.

K. Dabov, A. Foi, V. Katkovnik, and K. Egiazarian. "Image denoising by sparse 3-D transform-domain collaborative filtering", 2007.

V. Jain and H. S. Seung. "Natural image denoising with convolutional networks", 2008.

K. Zhang, W. Zuo, Y. Chen, D. Meng, and L. Zhang. "Beyond a Gaussian denoiser: Residual learning of deep CNN for image denoising", 2017.

S. W. Hasinoff, D. Sharlet, R. Geiss, A. Adams, J. T. Barron, F. Kainz, J. Chen, and M. Levoy. "Burst photography for high dynamic range and low-light imaging on mobile cameras", 2016.

Z. Liu, L. Yuan, X. Tang, M. Uyttendaele, and J. Sun. "Fast burst images denoising", 2014.

X. Dong, G. Wang, Y. Pang, W. Li, J. Wen, W. Meng, and Y. Lu. "Fast efficient algorithm for enhancement of low lighting video", 2011.

H. Malm, M. Oskarsson, E. Warrant, P. Clarberg, J. Hasselgren, and C. Lejdfors. "Adaptive enhancement and noise reduction in very low light-level video", 2007.

A. Łoza, D. R. Bull, P. R. Hill, and A. M. Achim. "Automatic contrast enhancement of low-light images based on local statistics of wavelet coefficients", 2013.

S. Park, S. Yu, B. Moon, S. Ko, and J. Paik. "Low-light image enhancement using variational optimization-based Retinex model", 2017.

X. Guo, Y. Li, and H. Ling. "LIME: Low-light image enhancement via illumination map estimation", 2017.

C. Chen, Q. Chen, J. Xu, V. Koltun. "Learning to See in the Dark", 2018.

Z. Wang, E. P. Simoncelli, A. C. Bovik. "Multiscale structural similarity for image quality assessment", 2004.

Rizwan, M., Islam, M. K., & Habib, H. A. "Local enhancement for robust face detection in poor SNR images", 2009.

Socolinsky, D. A., Wolff, L. B., & Lundberg, A. J. "Image intensification for low-light face recognition", Jun. 2006.

Ren, D., Ma, H., Sun, L., & Yan, T. "A novel approach of low-light image used for face recognition", Dec. 2015.

Kang, Y., & Pan, W. "A novel approach of low-light image denoising for face recognition", 2014.

Cho, S., Baek, N., Kim, M., Koo, J., Kim, J., & Park, K. "Face Detection in Nighttime Images Using Visible-Light Camera Sensors with Two-Step Faster Region-Based Convolutional Neural Network", 2018.

International Search Report issued in corresponding international application No. PCT/CN2020/109581 dated Nov. 26, 2020.

\* cited by examiner

METHOD AND APPARATUS FOR IMAGE PROCESSING, TERMINAL

CROSS-REFERENCE TO RELATED APPLICATION(S)

This application is a continuation of PCT/CN2020/109581, filed Aug. 17, 2020, which claims priority to and the benefit of U.S. Provisional Application Patent Ser. No. 62/909,072, filed Oct. 1, 2019, the entire disclosures of both of which are hereby incorporated by reference.

TECHNICAL FIELD

This disclosure relates to image processing, and more particularly to a method and an apparatus for image processing based on neural networks and a terminal.

BACKGROUND

Acquiring photos with good perceptual quality under low illumination conditions is extremely challenging due to the low signal-to-noise ratio (SNR). Extending the exposure time can acquire visually good images. However, it can easily introduce motion blur which will introduce extra difficulties to face recognition. To make the low-light images with short exposure time visually plausible, extensive study has been conducted including denoising techniques which aim at removing the noises included in the image due to the low illumination condition, and enhancement techniques which are developed for improving the perceptual quality of digital images. However, current denoising methods are generally proposed and evaluated on synthetic data, which do not generalize well to real images and the low-light enhancement approaches do not take the noise into consideration explicitly.

In addition, in the past few decades, face recognition has been extensively studied and has been successfully delivered to modern mobile phones for unlocking and payment. However, recognizing face under low light remains a challenge since the low-light images are extremely noisy.

SUMMARY

According to a first aspect of the disclosure, a method for image processing is provided. An input image is obtained and processed in a neural network to obtain an output image according to global information of the input image.

According to a second aspect of the disclosure, an apparatus for image processing is provided. The apparatus includes at least one processor and a memory. The memory is coupled with the at least one processor and configured to store instructions which, when executed by the at least one processor, are operable with the at least one processor to implement a neural network to: receive an input image and process the input image in the neural network to obtain an output image according to global information of the input image.

According to a third aspect of the disclosure, a terminal is provided. The terminal includes a camera, an image processing device, and a processor. The camera is configured to capture a facial image of a user. The image processing device is coupled with the camera and is configured to receive and process the facial image to obtain an output image according to global information of the facial image, where the image processing device is neural network based. The processor is configured to compare the output image with a pre-stored facial image template and determine that face recognition is successful when the output image is matched with the pre-stored facial image template.

Features and details of the forging aspects and respective embodiments thereof can be combined or substituted with each other without conflicts.

BRIEF DESCRIPTION OF DRAWINGS

The disclosure can be better understood from the following detailed description when read in conjunction with the accompanying drawings. It is emphasized that, according to common practice, various features of the drawings are not to-scale. On the contrary, the dimensions of the various features are arbitrarily expanded or reduced for clarity. The same reference numerals are used throughout the drawings to refer like components or features.

DETAILED DESCRIPTION

Figure 1:
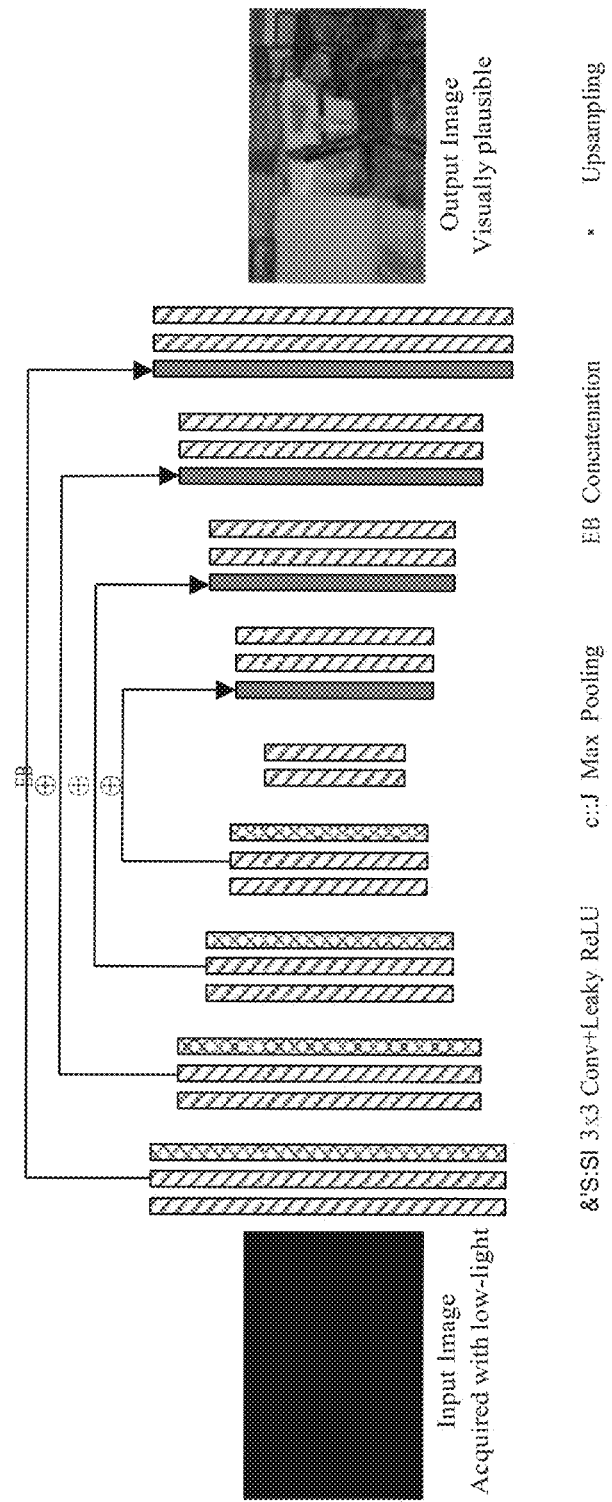
FIG. 1 illustrates a traditional U-net.

Image denoising and enhancement for low-light images are highly desired on mobile devices, and have been extensively studied in the past decades which are discussed in the following sections. Low-light images refer to images which are taken under extreme low-lighting conditions, and thus have low contrast, low brightness, and high noise. The low lighting condition is not necessarily just night. Indoors photography without much ambient light (as in many of our homes) as well as the light that is barely visible to our eyes at night, are also considered to be low-lighting conditions. Examples of low-lighting conditions include but not limited to shadow areas in daylight, low light environments after sunset, as well as at night where only brightest objects can be seen.

(1) Image Denoising

Image denoising is performed to remove noises caused by low level light exposure and preserve the details in images at the same time.

Traditional practices for image denoising are often based on specific assumptions such as image smoothness, sparsity, low rank, or self-similarity.

Most recently, deep convolutional neural networks (CNN) based methods are developed for image denoising. However, those methods are generally developed and evaluated mainly on synthetic data and do not generalize well to real images. Synthetic data, as the name suggests, is data that is artificially created rather than being generated by actual events.

In addition, a set of approaches uses a burst of images taken at the same time to perform denoising. Although it generally yields good performance, they are elaboratively and computationally expensive.

(2) Low-Light Image Enhancement

Low-light image enhancement is a highly demanded image processing technique, especially for consumer digital cameras and cameras on mobile phones. Low-light image enhancement is a process of improving the quality of a digitally stored image by manipulating the image with algorithms. Low-light image enhancement is challenging in that it needs to consider not only brightness recovery but also complex issues like color distortion and noise, which usually hide in the dark.

A number of techniques have been developed for image enhancement, such as histogram equalization, and gamma correction. Recently, more advanced approaches have been proposed to deal with the enhancement of low-light images. However, these models share a strong assumption where the input image has clean representation without any noise. Thus, a separate denoising step should be employed beforehand for low-light image enhancement.

In C. Chen, Q. Chen, J. Xu, V. Koltun, "Learning to See in the Dark", In CVPR, 2018, an encoder-decoder CNN is employed to perform denoising, as well as image enhancement at the same time. However, since the global information is not considered in image processing, color inconsistency can be spotted in the output images. Global information or global feature of an image refers to the feature that can represent the whole image. The global feature is relative to the local feature of the image, and is used to describe the color, context, texture, and shape of the image or target.

As can be seen, the low-light enhancement approaches do not take the noise into consideration explicitly, and most of the current approaches perform image denoising and enhancement separately, which is time and computing costly. Moreover, although Chen performs image denoising and enhancement jointly and achieves promising results, it fails to consider the global information (such as context/color) which is crucial for color consistency in the output images.

On the other hand, extensive efforts have been devoted to face recognition in the past few decades. To improve the performance of low-light face recognition system, a couple of traditional methods were developed. In addition, hybrid sensing data was proposed to be employed for low-light face recognition. This requires multiple sensors, introducing extra cost and difficulties to industrial design. Most recently, CNNs have shown promising results on various computer vision tasks including image enhancement.

FIG. 1 illustrates a traditional U-net. As illustrated in FIG. 1, the U-net consists of 18 convolutional layers (represented by blocks marked as "3×3 Conv+Leaky ReLU"). "ReLU" refers to a rectified linear unit, which is an activation function commonly used in artificial neural networks. The input image, which is an image obtained with low-light and thus can be deemed as a low-light image, firstly goes through a set of downsampling stages to extract abstract features, as well as to reduce the spatial resolution. After the bottleneck, the feature map outputted from the downsampling stages will go through a set of upscaling operations, that is, upscaling stages. "Feature map" is a function which maps a data vector to feature space, from another perspective, a feature map is the output activations for a given filter. In the upscaling stages, the input layer is firstly upscaled and then concatenated with the layer of the same resolution from the downsampling stage, indicated by the directed arrow in FIG. 1. This operation can effectively preserve the details in an image. Finally, an output image which is visually plausible is outputted at the upscaling stages.

However, since the input image can be of any resolution, the size of the feature maps in the bottleneck of the network can still be large, where the global context/color information cannot be observed. As a result, the generated image may have inconsistent colors at different locations.

Taking the above into consideration, in this disclosure, an approach is developed to perform denoising and enhancement in an end-to-end fashion for low-light images with global context/color information integrated. Specifically, a strategy is developed to introduce global context/color information into the network. It is expected to perform low-light image denoising and enhancement in a single shot with the integration of the global context, as such, the network is made to be aware of the global context/color information to better generate the final output. Furthermore, a CNN-based image enhancement approach for face recognition under low-light conditions is provided. Specifically, the output of the network can be employed as the input of any advanced face recognition system to produce face recognition results.

For illustrative purpose, specific exemplary embodiments will now be explained in detail below in conjunction with the figures.

The embodiments for image processing and face recognition set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Figure 2:
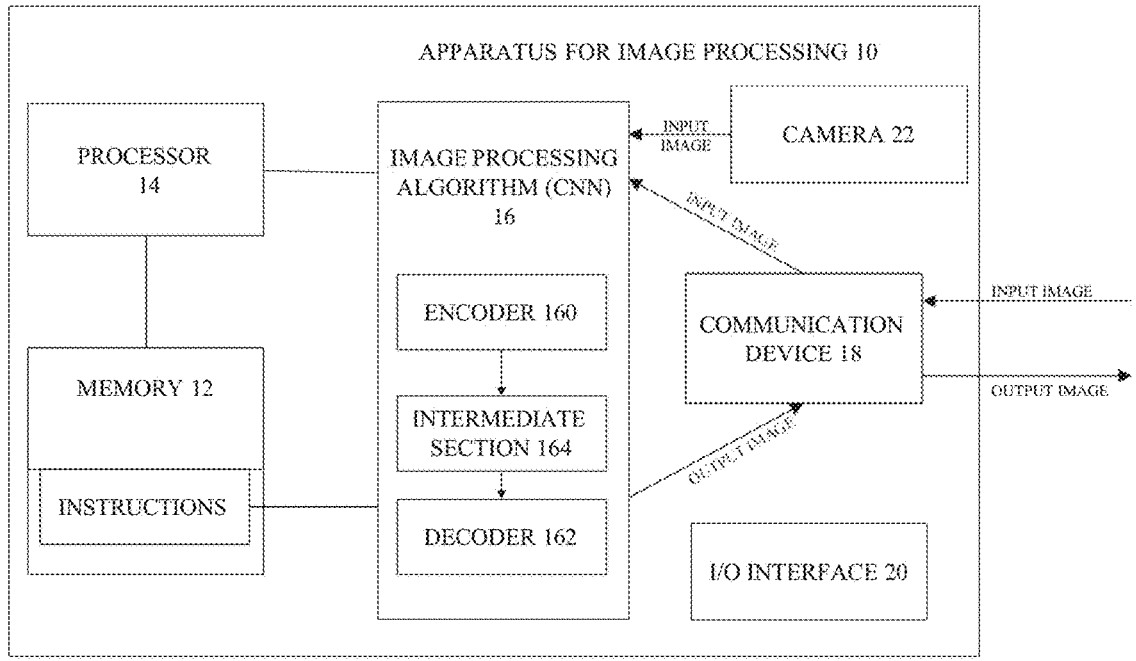
FIG. 2 is a block diagram illustrating an apparatus for image processing according to an embodiment of the disclosure.

FIG. 2 illustrates an example apparatus in which embodiments of image processing can be implemented. As illustrated in FIG. 2, an apparatus 10 for image processing is provided. The apparatus 10 can be any type of computing device, client device, server, mobile phone, tablet, communication device, entertainment device, gaming device, media playback device, and/or other type of device.

The apparatus 10 includes a memory 12 and a processor 14. The memory 12 is for storing instructions which, when executed by the processor 14 or a processing system of the apparatus 10, are operable the apparatus 10, specifically, the processor 14, to implement image processing algorithm 16 (e.g., as a module, a device, a system, a component, a software application, a neural network, etc.) on the processor 14. The neural network referred to herein can be a deep neural network (DNN), a recurrent neural network (RNN), a convolution neural network (CNN), or any other suitable neural networks. In the following, take CNN 16 as an example for illustrative purpose only.

The CNN 16 receives an input image and conducts a series of operations on the input image received to obtain an output image, which can be comprehended as an enhanced image or denoised image. The series operations include but not limited to upsampling or upscaling, convolution with different kernel sizes, downsampling or downscaling, concatenation, and the like.

The apparatus 10 also includes an input/output (I/O) interface 20, such as data network interfaces that provide connection and/or communication links between apparatuses, devices, data networks, and the like. The I/O interface 20 can be used to couple the device to any type of components, peripherals, and/or accessory devices, such as a digital camera device. The digital camera device may be alternatively integrated with apparatus 10. The I/O interface 20 also include data input ports via which any type of data, media content, and/or other inputs can be received from a user or outside, as well as any type of audio, video, and/or image data received from any content and/or data source.

The input image is generally obtained in low-light conditions and has low contrast, low dynamic range, and is extremely noisy. The input image can be inputted to the apparatus 10 through a communication device 18 of the apparatus 10. Similarly, the output image with fruitful details and vivid colors can be outputted and/or presented to a user through the communication device 18. The communication device 18 can enable wired and/or wireless communication of data such as images, videos, and/or graphic data generated by applications running on the apparatus for example.

Figure 3:
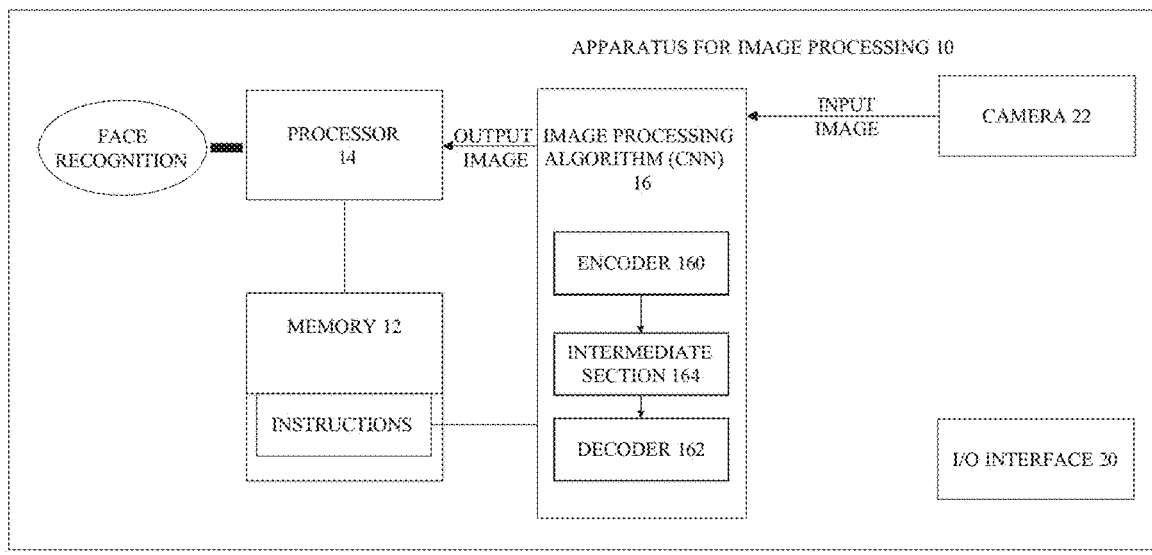
FIG. 3 is a block diagram illustrating an apparatus for image processing according to another embodiment of the disclosure.

Additionally or alternatively, as illustrated in FIG. 2 and FIG. 3, the apparatus 10 may further include a camera 22, through which users can take pictures under low-light conditions. When the camera 22 is included, the camera 22 can communicate with the CNN 16. For instance, the pictures or images obtained by the camera 22 can be used as the input image to be processed by the CNN 16. In one implementation, the camera 22 is a front camera for taking facial images of a user. The image or picture obtained by the camera 22 is input into the CNN 16 as the input image, after being subjected to processing in the CNN 16, a denoised output image can be outputted to the processor 14, as illustrated in FIG. 3.

The processor 14 will compare the denoised output image with a pre-stored facial image template, and determine whether face recognition is successful according to the comparison. For example, the face recognition is determined to be successful when the denoised output image is matched with the pre-stored facial image template; otherwise, the face recognition fails. As one implementation, when the number of features in the denosided output image that match features in the pre-stored facial image template is greater than a preset threshold, face recognition can be determined to be successful. Since the image for face recognition is a denoised image, the accuracy of face recognition can be improved. The processor 14 configured for face recognition can be a face-recognition specific processor with face recognition function integrated or any other general processor.

In embodiments of the disclosure, to implement image processing to obtain the denoised output image, an encoder-decoder network is employed to perform image denoising and enhancement to improve the perceptual quality of an image taken under extremely low-light condition. In this regard, the CCN 16 can be structured to have an encoder 160 and a decoder 162. Compared with the U-net of FIG. 1, the CNN 16 of FIG. 2 is structured to have an intermediate section 164 between the encoder 160 and the decoder 162, where the intermediate section 164 is introduced for at least global information extraction purpose, as detailed below. The encoder 160 and the decoder 162 can interact with the intermediate section 164 as well as interact with each other.

Each of the encoder 160, the decoder 162, and the intermediate section 164 can be structured to have at least one layer or multi-layers.

In the context, the terms "upscaling" and "upsampling" can be used interchangeably. Similarly, the terms "downscaling" and "downsampling" can be used interchangeably. The encoder or encoding network can be referred to as or include "upscaling stage(s)" or "upsampling stage(s)" and the decoder or decoding network can be referred to as or include "downscaling stage(s)" or "downsampling stage(s)" respectively.

Image Processing

Figure 4:
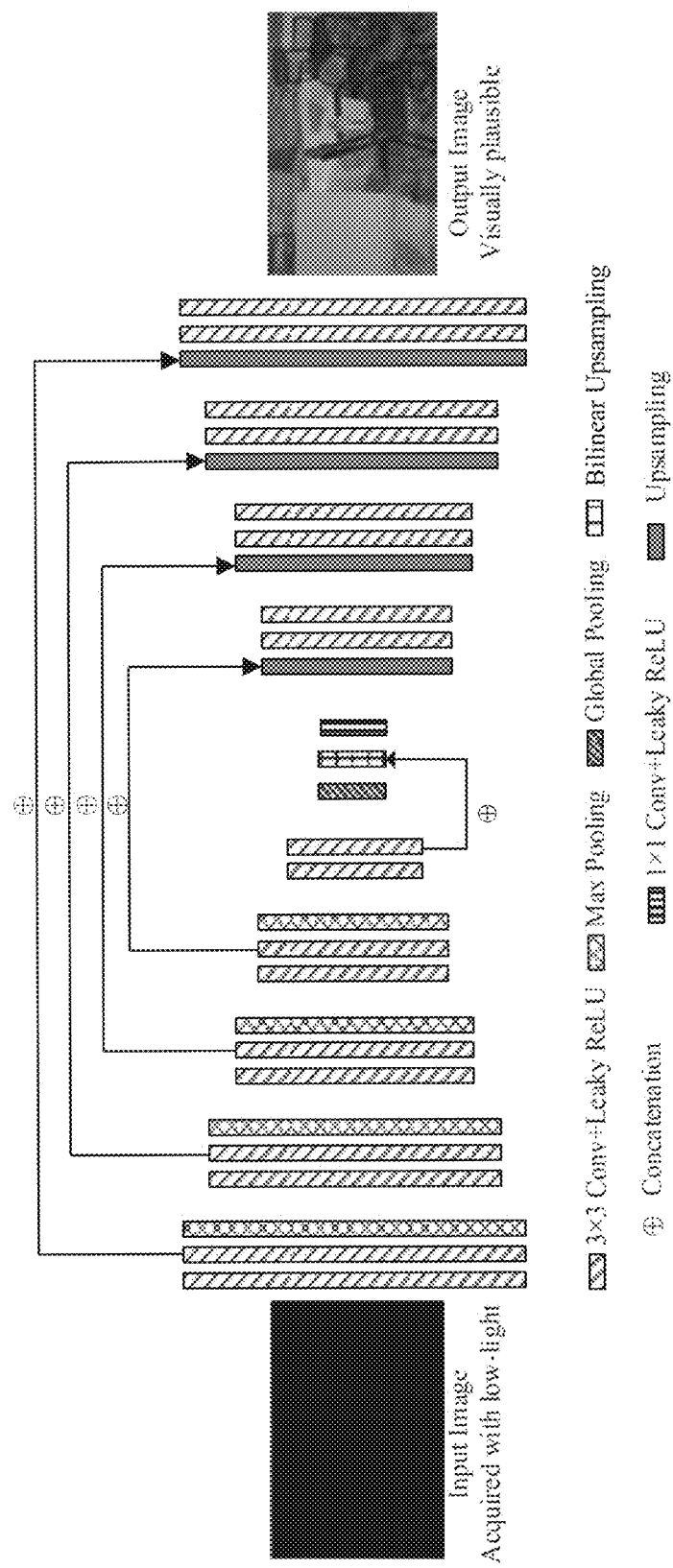
FIG. 4 illustrates pipelines of a convolutional neural network (CNN) according to an embodiment of the disclosure.

FIG. 4 illustrates pipelines of a framework of an exemplary CNN according to an embodiment of the disclosure. As illustrated in FIG. 4, the CNN can be implemented as a U-net, which generally includes a contracting path and an expanding path. The U-net illustrated in FIG. 4 consists of a stack of processing layers. The input image, which is obtained with low light and thus can be deemed as a low-light image, firstly goes through an encoder (the four left sets of columns of FIG. 4, such as the encoder 160 of FIG. 2) including a set of downsampling stages to extract abstract features, as well as to reduce the spatial resolution. After the bottleneck (the two middle sets of columns of FIG. 4, such as the intermediate section 164 of FIG. 2), the feature map will go through a decoder (the four right sets of columns of FIG. 4, such as the decoder 162 of FIG. 2) composed of a set of upsampling stages.

The U-net illustrated in FIG. 4 is trained in an end-to-end fashion to generate a noise map of the input image taken under a low-light condition. Specifically, given an input image, I, the U-net illustrated is employed to learn a mapping, $\Delta I = f(I:w)$, to estimate the noise map of the input image, where w is a set of learnable parameters of the network. The final denoised output is obtained by take the element wise summarization between the input image and the predicted noise map, i.e. $\hat{I} = I + \Delta I$.

Figure 7:
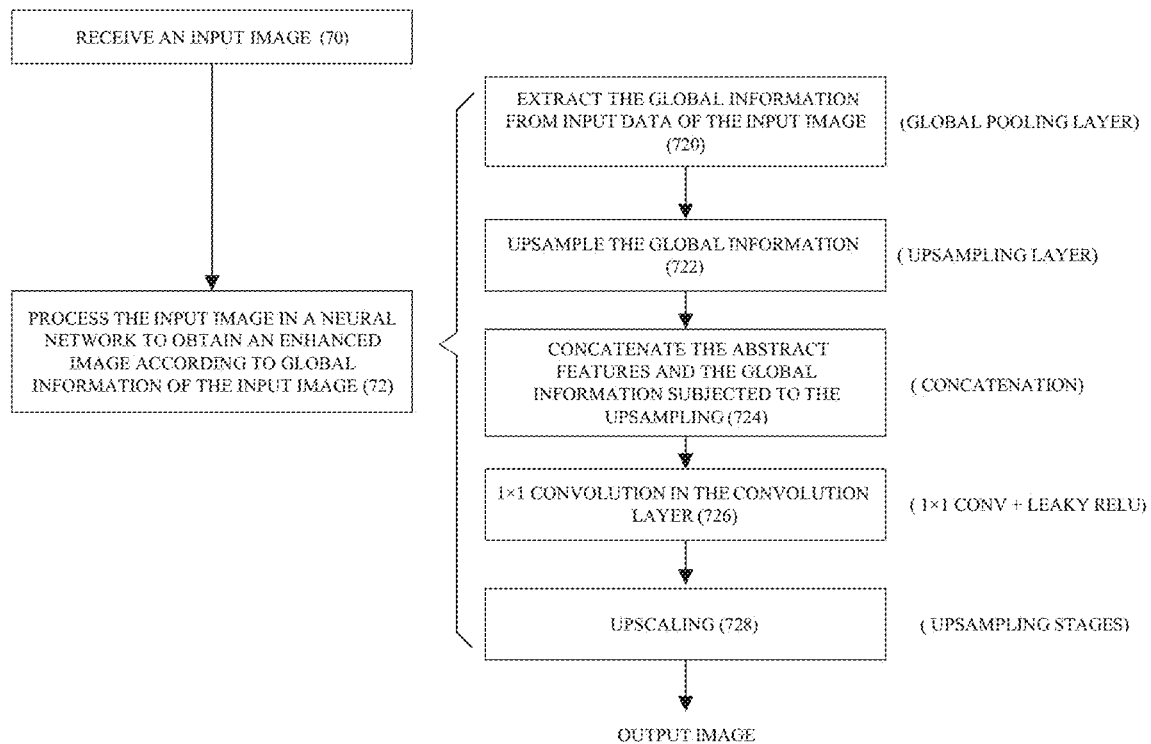
FIG. 7 is a flowchart illustrating a method for image processing according to an embodiment of the disclosure.

Based on the above, a method for image processing is provided. FIG. 7 is a flowchart illustrating the method. As illustrated in FIG. 7, in the method, an input image is received at block 70 and then processed at block 72 in a neural network to obtain an output image according to global information of the input image. The input image is an image obtained under low-light conditions and therefore is noisy. Compared with the input image, the output image thus obtained is an enhanced image. The enhanced image can be comprehended as a denoised image.

Figure 5:
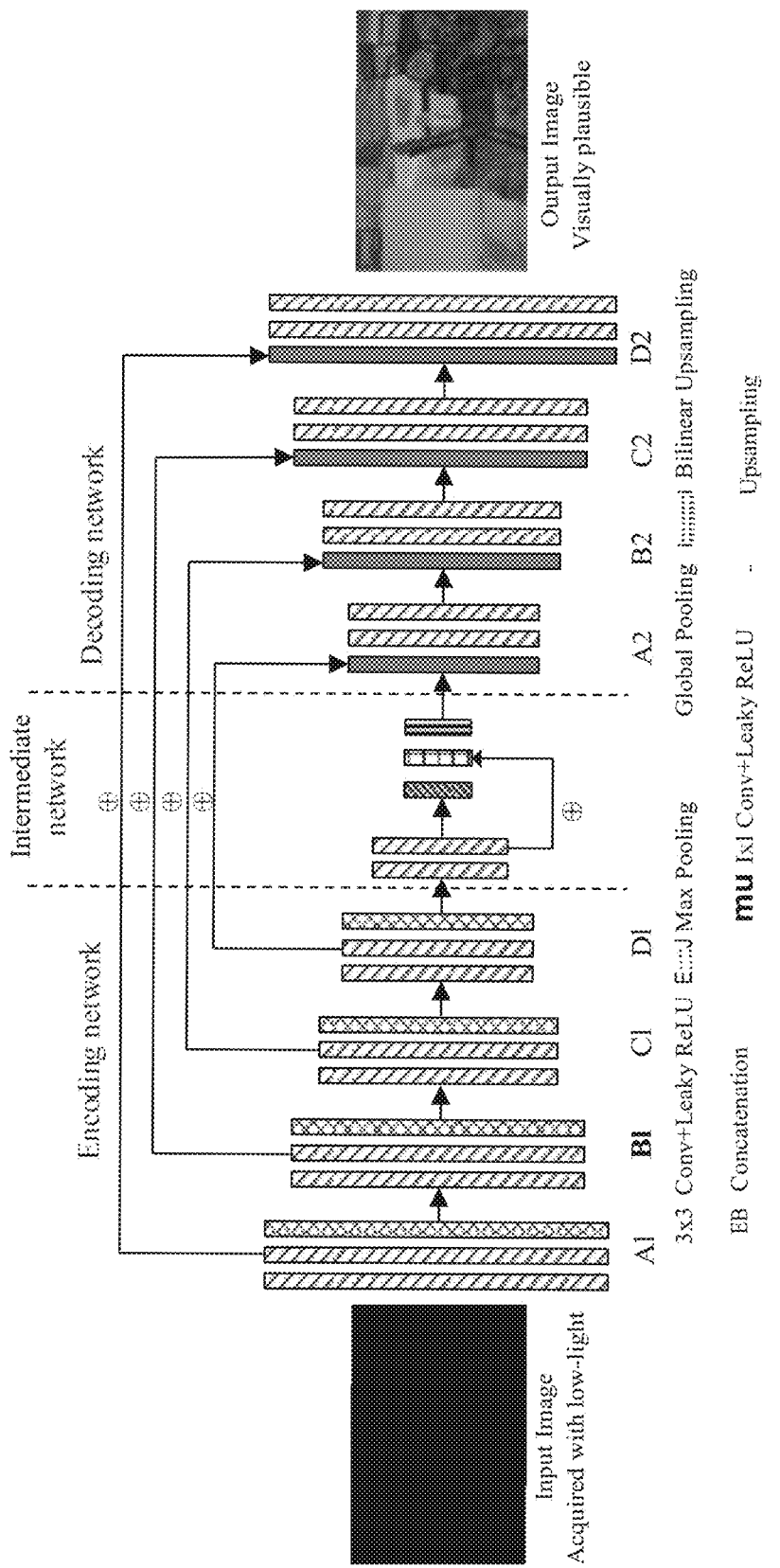
FIG. 5 illustrates pipelines of a CNN according to another embodiment of the disclosure.

The neural network used herein can be a CNN structured to have the framework of FIG. 4. The CNN is divided into different networks in FIG. 5 for ease of explanation. As illustrated in FIG. 5, the CNN includes an encoding network (corresponding to the encoder of FIG. 2), an intermediate network (corresponding to the intermediate section of FIG. 2), and a decoding network (corresponding to the decoder of FIG. 2).

In image processing filed, the global information or global features describe an image as a whole to generalize the entire object. Global information includes contour representations, shape descriptors, color features, and texture features. In CNN, the global information is obtained via global pooling as with all features of the image contributes to such global information by "mean" or "average" operation.

Figure 6:
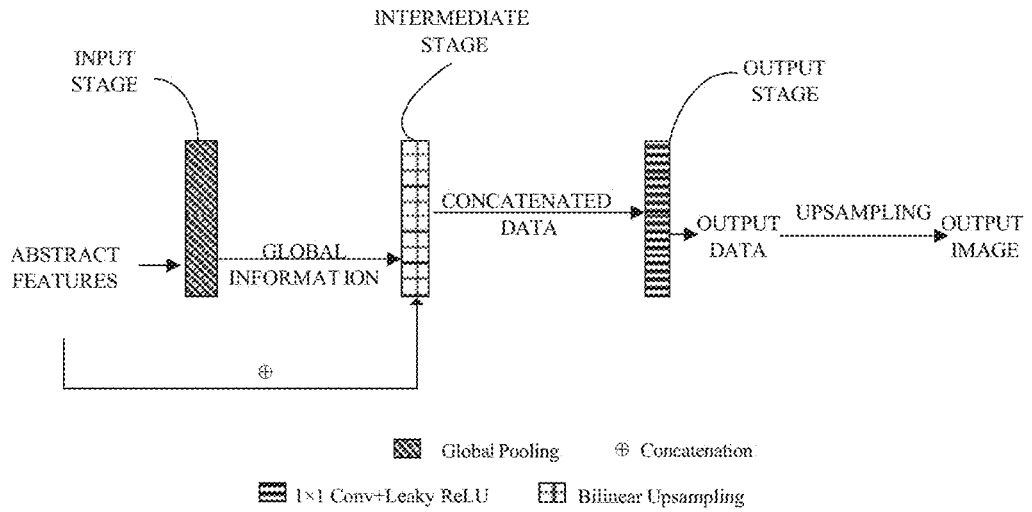
FIG. 6 illustrates an intermediate network of the CNN of FIG. 5.

FIG. 6 illustrates data processing in the intermediate network of FIG. 5. The intermediate network includes an input stage, an intermediate stage, and an output stage. In one implementation, as illustrated in FIG. 6, the input stage includes a global pooling layer to extract global context information (global information for short). In FIG. 4 and FIG. 5, 3×3 kernels are used to extract features in the encoding network, then with the global pooling layer, the features are averaged to include global based information, and in this way, the global information is obtained. From the perspective of the CNN, the global information is obtained via a "mean" operation of global features, and each global feature contributes to the global information.

The intermediate stage includes an upsampling layer. For example, the upsampling layer is a bilinear upsampling layer. Through the upsampling layer, a feature map can be rescaled back to the same size of an input feature map (specifically, a feature map inputted into the global pooling layer) to perform following process. For instance, the size of a feature map inputted into the global pooling layer is H×W, where H and W are positive integers greater than 1, after processing in the global pooling layer, a feature map sized 1×1 will be outputted to the upsampling layer to be upscaled to obtain an output feature map of the same size H×W. The "following process" for example includes concatenation process as well as convolutional process. To achieve convolution in the output stage, the output stage is structured to include successive convolution layers, and in this regard, the "output stage" can be referred to as a "convolution stage". In one implementation, while only one 1×1 convolution layer (1×1 Conv+Leaky ReLU) is employed in FIG. 4 to FIG. 6, the successive convolution layers may comprise more than one 1×1 convolution layer.

In the architecture given above, the global pooling layer is introduced into a U-net to extract global information for de-noising purpose, as such, the denosied output image according to global information of the input image can be obtained, details of which are given below with reference to the CNN of FIG. 5 and FIG. 6.

In the input stage, that is, in the global pooling layer, the global information is extracted from input data of the input image (720). The input data is received from the encoding network. The input data can be abstract features of the input image for example. The abstract features refer to some abstract information and can be comprehended as some high-level local information of the image. High-level information is also referred to as advanced semantic information, and can be a piece of information synthesized through some information such as environmental information, texture information and so on. In the CNN, in terms of the abstract features, it can be obtained by performing a set of downsampling operations on the input image in the encoding network of FIG. 5.

Then in the intermediate stage, that is, in the upsampling layer, the global information is upsampled (722). After that, the abstract features and the global information subjected to the upsampling are concatenated (724) to perform convolution in the convolution stage, that is, the output stage, thereafter, the enhanced image can be obtained in the decoding network. Data obtained by concatenating the abstract features and the global information subjected to the upsampling can be referred to as concatenated data, as illustrated in FIG. 6.

Specifically, in the output stage including the 1×1 convolution layer, 1×1 convolution is performed on the concatenated data (726). The output data obtained after such convolution is then provided to the decoding network to go through a set of upsampling stages, and a final output image can be obtained.

In the decoding network, a layer in which the output data is received is upscaled, concatenated with a layer of a same resolution from the encoding network, and then convoluted to be provided to a next upsampling stage. In FIG. 4 and FIG. 5, four upsampling stages are illustrated. Once all the upsampling stages are performed, the denoised output image can be obtained. Specifically, as illustrated in FIG. 5, the following pairs of layers have the same resolution: layer A1 in the encoding network and layer A2 in the decoding network; layer B1 in the encoding network and layer B2 in the decoding network; layer C1 in the encoding network and layer C2 in the decoding network; and layer D1 in the encoding network and layer D2 in the decoding network. Layer A2, B2, C2, and D2 are each an input layer of the upscaling stages of the decoding network. Based on the above, take layer B2 as an example, layer B2 receiving the output data from previous stage is concatenated with layer B1 in the encoding network, and then convoluted to be provided to the next stage (that is, layer C2) in the decoding network. Layer C2 which receives the output data from the previous stage is concatenated with layer C1 in the encoding network, and then convoluted to be provided to the next stage (that is, layer D2) in the decoding network. Similarly, layer D2 which receives the output data from the previous stage is concatenated with layer D1 in the encoding network, and then convoluted to provide an output image. Besides, convolution layers with kernel size of 3×3 are employed in the decoding network. It is ideal to use convolution layers of the same kernel size in both the encoding network and the decoding network.

Face Recognition

The output image obtained through the method of FIG. 7 and/or with usage of the CNN illustrated in any of FIG. 4 to FIG. 6 is an enhanced image which can be effectively used for face recognition, especially low-light face recognition. In this regard, a method for face recognition is further provided.

Figure 8:
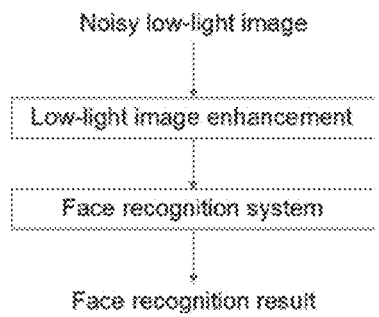
FIG. 8 is flowchart illustrating a method for face recognition according to an embodiment of the disclosure.

The face recognition can be performed in a mobile terminal or other terminals equipped with face recognition function. FIG. 8 is a flowchart illustrating the method for face recognition. As illustrated in FIG. 8, an acquired facial image(s) under low-light condition is firstly passed through the enhancement network for perceptual quality improvement. After image processing in the enhancement network, an enhanced facial image can be obtained. The enhancement network employed here can be the CNN illustrated in any of FIG. 4-FIG. 6. Then, face recognition can be conducted on the enhanced facial image with improved quality using any advanced face recognition system.

Such face recognition can be done with the apparatus illustrated in FIG. 2. The camera 22 can be invoked to acquire a facial image of a user. As mentioned above, the camera 22 can be a front facing camera, and the facial image is captured in a low-light condition. Then the facial image is provided to image processing algorithm (or device) 16. The image processing algorithm can be embodied as the CNN of any of FIG. 4-FIG. 6. With the image processing method provided herein, an enhanced image considering global information of the facial image can be obtained. Then the enhanced image can be outputted into the processor 14, which will carry out face recognition based on the enhanced image. For example, the processor 14 compares the enhanced image with a pre-stored facial image template and determines that the face recognition is successful when the enhanced image is matched with the pre-stored facial image template. The facial image template can be stored in the memory 12.

Similar to the image processing described above, to obtain the enhanced image considering global information of the facial image, the image processing device 16 configured to process the facial image is configured to: extract, in the input stage (for example, the global polling layer), the global information from abstract features of the facial image, where the abstract features are received from the encoding network; upsample, in the intermediate stage (for example, the Bilinear upsampling layer), the global information; concatenate the abstract features with the global information subjected to upsampling to perform convolution in the output stage (for example, the 1×1 convolution layer+Leaky ReLU), to obtain the enhanced image in the decoding network. The enhanced image thus obtained is visually plausible.

The input stage includes the global pooling layer. The intermediate stage includes the upsampling layer. The output stage includes successive convolution layers, for example, at least one 1×1 convolution layer.

According to one embodiment, the image processing device is further configured to: perform, in the encoding network of FIG. 5, a set of downsampling operations on the facial image to obtain the abstract features.

According to one embodiment, the image processing device is further configured to: perform, in the decoding network of FIG. 5, a set of upsampling operations on convoluted output received from the output stage (for example, the 1×1 convolution layer+Leaky ReLU) of the intermediate network to obtain the enhanced image.

It should be noted that, the facial image captured by the camera 22 may first go through pre-processing before being provided to the CNN or before being downscaled in the CNN, as detailed below.

Input Image Pre-Processing

Figure 9:
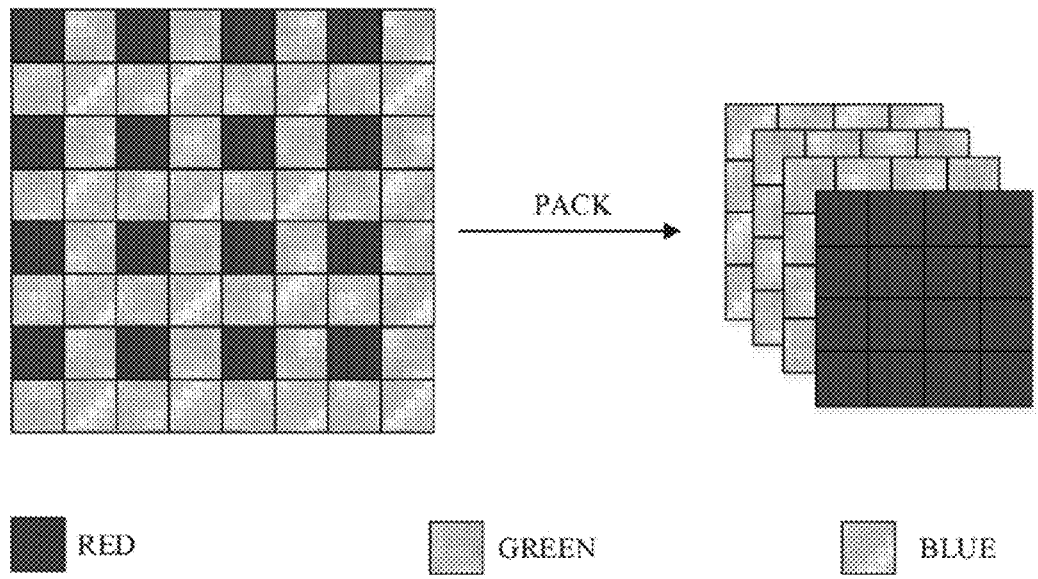
FIG. 9 illustrates packing of a Bayer array into four channels.

FIG. 9 illustrates packing of a Bayer array into four channels.

In one example, the raw facial image is in Bayer arrays, which are packed into four channels, that is, R, G1, G2, and B channels, respectively as illustrated in FIG. 9. Then the packed images subtract the black level and multiply with an amplification factor to match the brightness of the corresponding ground-truth images. Such pre-processing can be done outside the CNN separately, or can be done at the front end in the CNN before downscaling. The input raw image thus processed is inputted into the encoding network as the input image.

Inference

Figure 10:
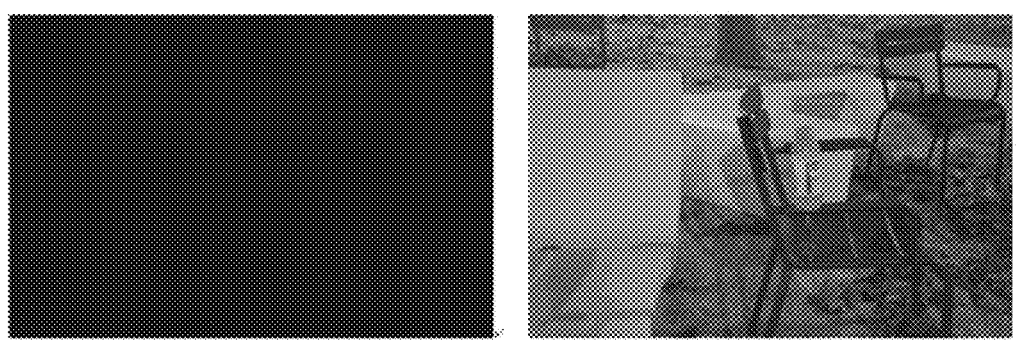
FIG. 10 illustrates an input image and an output image obtained through the method for image processing provided herein.

FIG. 10 illustrates an input low-light raw image in sRGB color space and an output image in sRGB color space outputted through the proposed framework of FIG. 4-FIG. 6, and/or through the method of FIG. 7. During the inference process, given an input raw image (illustrated in the left part of FIG. 10), the output raw image (illustrated in the right part of FIG. 10) will be obtained by summarizing the output of the well-trained network and the input raw image. Some qualitative results are given in FIG. 7.

Implementation Details on Mobile Phones

Figure 11:
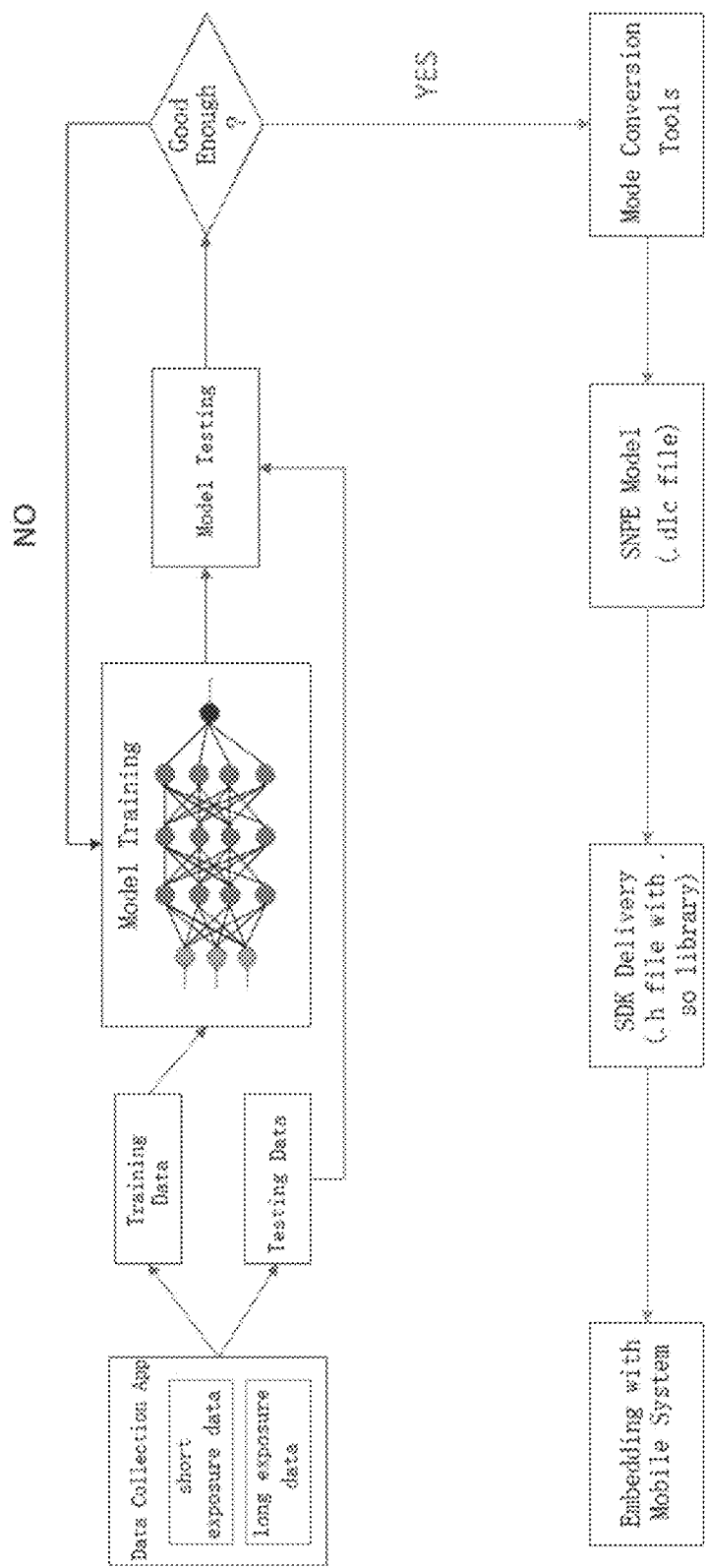
FIG. 11 illustrates pipelines of a snapdragon neural processing engine (SNPE).

In this disclosure, for example, snapdragon neural processing engine (SNPE) is employed as the mobile inference framework. SNPE SDK offers a bunch of CNN building components enabling most of the popular deep neural networks to run on Qualcomm devices with optimized performance on both GPU and DSP. FIG. 11 illustrates the whole pipeline of the proposed system. As illustrated in FIG. 11, a data collection App is employed to acquire data, the data includes short exposure data and long exposure data, which will be used as training data and testing data in subsequent stages. The training data is provided for model training, and the testing data will be used for model testing on the trained mode. Model training can be carried out many times, until a good enough model is obtained. The good enough model thus obtained will be converted into a SNPE model to be delivered and then embedded with a mobile system. Mobile phones can be structured such that the model can be running thereon, for example, one mobile phone can be structured to have the components and functions described above with reference to FIG. 2.

According to embodiments of the disclosure, a terminal is provided. "Terminal" used herein can be an electronic device with communication ability. The electronic device can include various handheld devices, on-board devices, wearable devices, computing devices or other devices with wireless communication function, other processing devices connected to wireless modems, as well as various user equipment (UE), mobile stations (MS), terminal devices, and the like. The term "mobile device" used herein includes but is not limited to mobile phones, personal digital assistant (PDA), or other handheld communication equipment, intelligent digital cameras or other handheld image processing equipment.

The terminal includes a camera, an image processing device, and a processor. The camera can be the camera 22 illustrated in FIG. 2 and FIG. 3. The image processing device can be implemented as the image processing algorithm 16 of FIG. 2 or FIG. 3. The processor can be implemented as the processor 14 of FIG. 2 or FIG. 3.

The camera configured to capture a facial image of a user. The image can be captured in a low-light environment. The image processing device is coupled with the camera and configured to receive and process the facial image to obtain an output image according to global information of the facial image, wherein the image processing device is neural network based. The processor is configured to compare the output image with a pre-stored facial image template and determine that face recognition is successful when the output image is matched with the pre-stored facial image template.

The image processing device comprises an encoding network, an intermediate network, and a decoding network, as illustrated in FIG. 4 and FIG. 5. The intermediate network comprises an input stage, an intermediate stage, and an output stage, as illustrated in FIG. 6. In the intermediate network, in the input stage, the global information is extracted from abstract features of the facial image, where the abstract features are received from the encoding network; in the intermediate stage, the global information is upsampled; and in the output stage, the abstract features are concatenated with the global information subjected to upsampling to perform convolution, to obtain the output image in the decoding network.

In the encoding network, a set of downsampling operations are performed on the facial image to obtain the abstract features. Correspondingly, in the decoding network, a set of upsampling operations are performed on convoluted output received from the output stage to obtain the output image.

Data Collection

A dataset is constructed for both training and testing purposes. Specifically, an app is developed to collect raw images with controlled ISO and shutter speed under low-light conditions. The app can be run on the apparatus for image processing given in FIG. 2. Each capture will return an image with short exposure time and an image with long exposure time, which will be used as the input image to the CNN illustrated in FIG. 4-FIG. 6 and the ground truth, respectively.

Deep Learning Container (DLC) Construction

After the model is trained and validated using Tensor flow, SNPE SDK is applied to convert the model into a DLC file which can run on Qualcomm devices.

Implementation on Mobile Devices

Android NDK is employed to combine the necessary data pre-processing and post-processing along with the DLC file to generate the SDK which contains a header file and a share object library. In the final stage, the SDK will be embedded into the mobile camera system so that the users can switch to an APP or algorithm which embodies the CNN provided herein when they take photos under low-light conditions.

Table 1 gives the performance of the proposed image enhancement network on different Qualcomm mobile devices, which demonstrates that the CNN framework or algorithm is ready to be delivered to mobile phones.

TABLE 1

Model performance across different mobile platforms

| Platform | Memory/MB | Speed/ms |
|---|---|---|
| Qualcomm 855 | 680 | 510 |
| Qualcomm 845 | 680 | 810 |
| Qualcomm 710 | 680 | 1400 |

It will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

One of ordinary skill in the art can understand that all or part of the process for implementing the above embodiments can be completed by a computer program to instruct related hardware, and the program can be stored in a non-transitory computer readable storage medium. In this regard, according to embodiments of the disclosure, a non-transitory computer readable storage medium is provided. The non-transitory computer readable storage medium is configured to store at least one computer readable program or instruction which, when executed by a computer, cause the computer to carry out all or part of the operations of the method for image processing. Alternatively or additionally, the non-transitory computer readable storage medium is configured to store at least one computer readable program or instruction which, when executed by a computer, cause the computer to carry out all or part of the operations of the method for face recognition.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for image processing, comprising:
receiving an input image; and
processing the input image in a neural network to obtain an output image according to global information of the input image,
wherein the neural network comprises an encoding network, an intermediate network, and a decoding network, the intermediate network comprising an input stage, an intermediate stage, and an output stage, processing the input image with the neural network to obtain the output image according to global information of the input image comprises:
extracting, in the input stage, the global information from input data of the input image, wherein the input data is received from the encoding network;
upsampling, in the intermediate stage, the global information; and
concatenating the input data with the global information subjected to the upsampling to perform convolution in the output stage, to obtain the output image in the decoding network.

2. The method of claim 1, wherein the input data is abstract features of the input image.

3. The method of claim 2, further comprising the following in the encoding network:
performing a set of downsampling operations on the input image to obtain the abstract features.

4. The method of claim 1, wherein the input stage comprises a global pooling layer.

5. The method of claim 1, wherein the intermediate stage comprises an upsampling layer.

6. The method of claim 1, wherein the output stage comprises successive convolution layers.

7. The method of claim 6, wherein the successive convolution layers comprise at least one 1×1 convolution layer.

8. The method of claim 7, further comprising the following in the output stage:
performing a 1×1 convolution on concatenated data obtained by concatenating the input data with the global information subjected to the upsampling, to obtain output data to be provided to the decoding network.

9. The method of claim 8, further comprising the following in the decoding network:
performing a set of upsampling operations on the output data to obtain the output image.

10. The method of claim 9, wherein performing the set of upsampling operations on the output data to obtain the output image comprises:
upsampling a layer in which the output data is received and then concatenating with a layer of a same resolution from the encoding network, to be provided to a next upsampling stage.

11. The method of claim 1, further comprising:
acquiring a facial image with a camera of a terminal and providing the facial image to the neural network as the input image.

12. The method of claim 11, further comprising:
conducting face recognition according to the output image.

13. The method of claim 12, wherein conducting face recognition according to the output image comprises:
comparing the output image with a pre-stored facial image template and determining that the face recognition is successful when the output image is matched with the pre-stored facial image template.

14. An apparatus for image processing, comprising:
at least one processor; and
a memory coupled with the at least one processor and configured to store instructions which, when executed by the at least one processor, are operable with the at least one processor to implement a neural network to:
receive an input image and process the input image in the neural network to obtain an output image according to global information of the input image,
wherein the neural network comprises an encoding network, an intermediate network, and a decoding network, the intermediate network comprises an input stage, an intermediate stage, and an output stage, the memory is further configured to store instructions which, when executed by the at least one processor, are operable with the processor to implement the neural network to:
extract, in the input stage, the global information from abstract features of the input image, wherein the input image is inputted into the encoding network and the abstract features are received from the encoding network;
upsample, in the intermediate stage, the global information; and
concatenate the abstract features with the global information subjected to upsampling to perform convolution in the output stage, to obtain the output image in the decoding network.

15. The apparatus of claim 14, wherein the memory is further configured to store instructions which, when executed by the at least one processor, are operable with the processor to implement the neural network to:
perform, in the encoding network, a set of downsampling operations on the input image to obtain the abstract features.

16. A terminal, comprising:
a camera configured to capture a facial image of a user;
an image processing device coupled with the camera and configured to receive and process the facial image to obtain an output image according to global information of the facial image, wherein the image processing device is neural network based; and
a processor configured to compare the output image with a pre-stored facial image template and determine that face recognition is successful when the output image is matched with the pre-stored facial image template,
wherein the image processing device comprises an encoding network, an intermediate network, and a decoding network, the intermediate network comprises an input stage, an intermediate stage, and an output stage,
wherein the image processing device configured to process the facial image to obtain the output image according to global information of the facial image is configured to:
extract, in the input stage, the global information from abstract features of the facial image, wherein the abstract features are received from the encoding network;
upsample, in the intermediate stage, the global information; and
concatenate the abstract features with the global information subjected to upsampling to perform convolution in the output stage, to obtain the output image in the decoding network.

* * * * *